Figure 1:
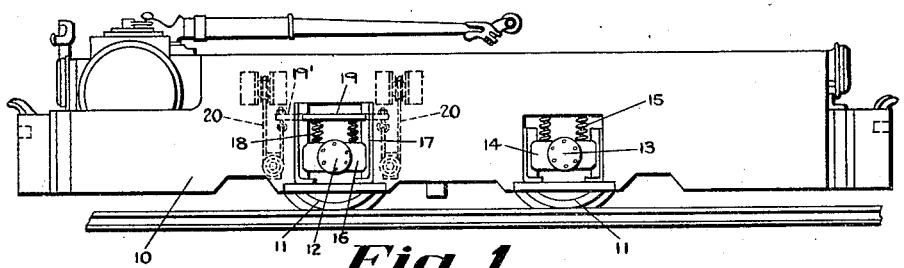

April 19, 1932.                N. D. LEVIN                1,854,595

EQUALIZING MECHANISM

Filed May 29, 1930

Patented Apr. 19, 1932

1,854,595

UNITED STATES PATENT OFFICE

NILS D. LEVIN, OF COLUMBUS, OHIO, ASSIGNOR TO THE JEFFREY MANUFACTURING COMPANY, OF COLUMBUS, OHIO, A CORPORATION OF OHIO

EQUALIZING MECHANISM

Application filed May 29, 1930. Serial No. 457,384.

The present invention has to do with equalizing mechanism, and is here shown as applied to a wheeled vehicle, the specific type of vehicle which is used to illustrate the invention being a mine locomotive of a not unusual kind.

The purpose of the invention is to provide mechanism which will maintain at all times a substantially uniform distribution of load, regardless of the character of the road bed or trackway over which the vehicle may be travelling.

This result is accomplished by providing compensating connections between the opposite ends of a wheeled axle so that if either wheel rises or falls, owing to irregularities in the road bed or trackway, with the resultant tilting of the axle, the compensating mechanism will respond to this shifting movement and tend to distribute the load uniformly.

In the drawings herewith:—

Figure 2:
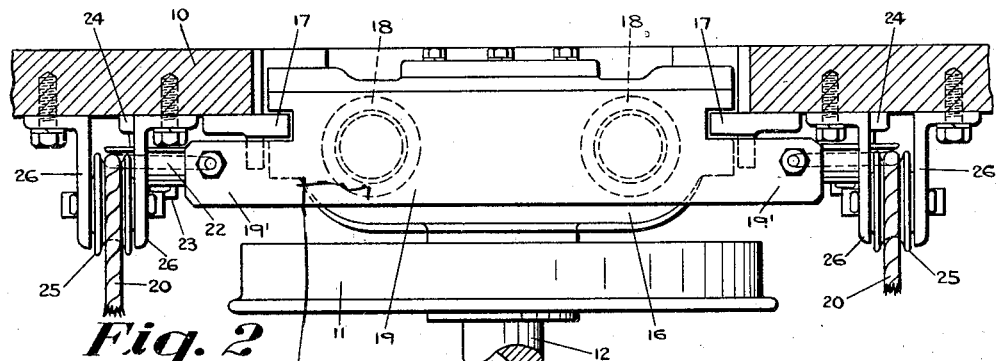
Figure 3:
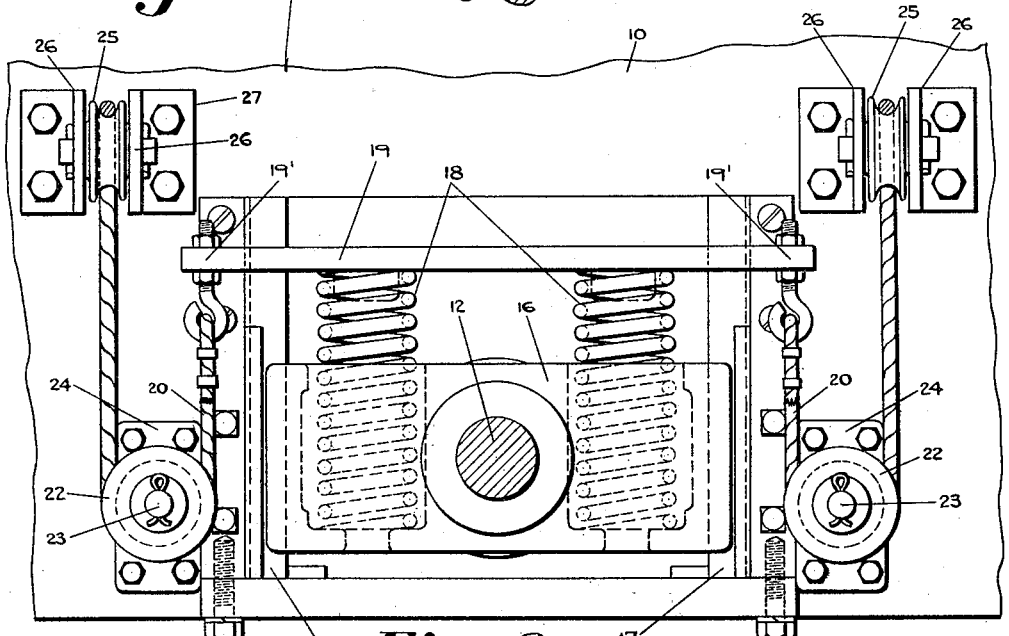

Figure 1 is a view in side elevation of an electric locomotive to which the invention is applied, Figure 2 is a view in plan looking down on a wheel and axle box, with the equalizing elements in proper relation thereto, the side frame being in section for clearness of illustration, and Figure 3 is a view in side elevation of the parts shown in Figure 2, with the wheel removed.

Referring to the drawings by numbers, like numbers indicating like parts in the several views, 10 indicates the sides of the vehicle frame, which is supported on the wheels 11 and axles 12 and 13. The axle 13 is mounted in the vertically movable axles boxes 14, between which boxes and the load are interposed resilient members, as the springs 15, engaging suitable abutments on the frame, which take up the thrust of the load against the box.

The axle 12 is mounted in axle boxes 16 vertically movable in guideways in the side frames 10, guide members 17 being provided to direct the movements of the boxes. Resilient members, as springs 18, are supported in suitable socket in the axle boxes 16, and support, at their upper ends, saddle members or cross bars 19, which, as shown in Figure 2, engage the guide members 17 so that they may move vertically in response to movements of the axle box 16 and the axle 12, which movements are imparted to it through the medium of the springs 18.

Each cross bar 19 has the projecting ends 19' which extend laterally, as shown in Figures 2 and 3, to points outside or beyond the area of the guide member 17, so as to bring such extended ends 19' of the cross bar or saddle into position for convenient attachment of the transmitting mechanism for transferring movements from one side of the vehicle to the other side of the vehicle. The movement transmitting means comprising suitable securing means, such as the eye bolts fastened to the ends 19' of the cross bar 19, to which are secured flexible transmitting means, such as the ropes 20, these ropes passing downwardly and around sheaves 22 rotatably mounted on stub axles 23 secured by means of plates 24, to the side frames 10, as shown in Figures 2 and 3. The ropes 20 then pass to the sheaves 25 rotatably mounted in bearing plates 26 secured to the side frame 10, and, as shown in Figure 2, pass transversely across the vehicle, where they engage correspondingly disposed sheaves, and are secured to a cross bar or saddle, disposed relative to the axle box on the other side of the vehicle, in the same manner as just described.

It will be seen that with this construction, relative movements of the frame and axle boxes, owing to irregularities in the road bed or track, will, through the cross bar or saddle and the transmitting mechanism described, be at once transferred to the corresponding mechanism at the other side, but with a reverse movement, and in the opposite direction, so that the distribution of the load will be substantially uniform by reason of the compensating effect of this equalizing mechanism. By providing the duplicate transfer connections at each end of the saddle or supporting bar 19, a balanced arrangement is provided which will take up and transmit in a direct manner and without lost motion, the relative movements of the frame and axle boxes from one side to the other of the vehicle, and a sensitive and quickly responsive mechanism is provided. It will be seen that by reason of the relation of the sheaves and the flexible draft members or ropes, a direct pull is provided for transmitting the equalizing stresses which not only adds to the effectiveness of the device, but also provides a construction in which wear of the parts is reduced to a minimum.

Deviations from the particular disclosure here found may be made without departing from the range of my invention as set forth in the appended claims.

I claim:

1. Equalizing mechanism comprising, in combination, a frame, relatively movable supporting means for said frame, and a plurality of devices symmetrically disposed relative to said supporting means to transmit relative movements of said frame and supporting means to equalizing mechanism on the opposite side of said frame.

2. Equalizing mechanism comprising, in combination, a frame, relatively movable supporting means for said frame, and means on both sides of said supporting means to transmit relative movements of said supporting means and said frame to equalizing mechanism on the other side of the frame.

3. Equalizing mechanism comprising, in combination, a frame, relatively movable supporting means for said frame, and flexible draft means on both sides of said supporting means to transmit relative movements of said supporting means and said frame to equalizing mechanism on the other side of the frame.

4. Equalizing mechanism comprising, in combination, a frame, relatively movable supporting means for said frame including a journal box, and transmitting means responsive to relative movements of said frame and box on either side of said box to transmit relative movements of said box and frame to equalizing mechanism on the other side of said frame.

5. Equalizing mechanism comprising, in combination, a frame, relatively movable supporting means for said frame including a journal box resiliently held relative to said frame, and transmitting means responsive to relative movements of said frame and box on either side of said box to transmit relative movements of said box and frame to equalizing mechanism on the other side of said frame.

6. Equalizing mechanism comprising, in combination, a frame, relatively movable supporting means for said frame, a movable member responsive to relative movements of said supporting means and said frame, and movement transmitting means secured to said member on both sides of said supporting means to transmit relative movements of said supporting means and said frame to equalizing mechanism on the opposite side of said frame.

7. Equalizing mechanism comprising, in combination, a frame, relatively movable supporting means for said frame, a movable member resiliently disposed relative to said supporting means and responsive to relative movements of said supporting means and said frame, and movement transmitting means secured to said member on both sides of said supporting means to transmit relative movements of said supporting means and said frame to equalizing mechanism on the opposite side of said frame.

8. Equalizing mechanism comprising, in combination, a frame, relatively movable supporting means therefor, a movable member resiliently disposed relative to said supporting means and responsive to relative movements of said supporting means and said frame, and draft members secured to said member in symmetrical position relative to said supporting means to transmit relative movements of said supporting means and said frame to equalizing mechanism on the opposite side of said frame.

9. Equalizing mechanism comprising, in combination, a frame, relatively movable supporting means therefor, a movable member resiliently disposed relative to said supporting means and responsive to relative movements of said supporting means and said frame, and flexible draft members secured to said member in symmetrical position relative to said supporting means to transmit relative movements of said supporting means and said frame to equalizing mechanism on the opposite side of said frame.

10. Equalizing mechanism comprising, in combination, a frame, relatively movable supporting means therefor, a movable member symmetrically and resiliently positioned with respect to said supporting means and responsive to relative movements between said supporting means and said frame, and flexible draft members connected in balanced relation with said movable member on each side of said supporting means to transmit relative movements of said frame and said supporting means to the opposite side of said frame.

11. Equalizing mechanism comprising, in combination, a frame, relatively movable supporting means therefor, a cross bar symmetrically disposed and resiliently connected with said supporting means and responsive to movements thereof, and draft members connected with each end of said cross bar to transmit relative movements of said supporting means and said frame to equalizing mechanism on the opposite side of said frame.

12. Equalizing mechanism comprising, in combination, a frame, relatively movable supporting means therefor, a cross bar symmetrically disposed and resiliently connected with said supporting means and responsive to movements thereof, and flexible draft members connected with each end of said cross bar to transmit relative movements of said supporting means and said frame to equalizing mechanism on the opposite side of said frame.

13. Equalizing mechanism comprising, in combination, a frame, relatively movable supporting means therefor, resilient members carried by said supporting means, a movable cross bar engaging said resilient members and responsive to relative movements of said supporting means and said frame, and flexible draft means connected with said cross bar on both sides of said supporting means to transmit relative movements of said supporting means and said frame to equalizing mechanism on the opposite side of said frame.

14. Equalizing mechanism comprising, in combination, a frame, relatively movable supporting means therefor including a journal box, springs carried by said journal box, a cross bar supported by said springs and responsive to relative movements of said supporting means and said frame, and flexible draft members secured to the ends of said cross bar on each side of said supporting means to transmit relative movements of said supporting means and said frame to equalizing mechanism on the other side of said frame.

15. Equalizing mechanism comprising, in combination, a side frame having guideways, supporting mechanism including an axle box movable in the guideways relative to said frame, springs carried by the journal box, a cross bar supported by said springs and responsive to relative movements of said supporting means and said frame with its ends projecting on each side beyond said supporting means, and flexible draft members connected to the ends of said cross bar to transmit relative movements of said supporting means and said frame to equalizing mechanism on the opposite side of said frame.

16. Equalizing mechanism comprising, in combination, a frame having guideways, relatively movable supporting means therefor comprising a journal box movable in said guideways, springs carried by said journal box, a cross bar engaging and movable in said guideways and supported by said springs with its ends projecting on each side beyond the journal box, and flexible draft members connected with the ends of said movable cross bar to transmit relative movements of said supporting means and said frame to equalizing mechanism on the opposite side of said frame.

17. Equalizing mechanism comprising, in combination, a frame, relatively movable supporting means therefor, a freely movable resiliently held member responsive to relative movements of said supporting means and said frame, and a plurality of transmitting means connected to said movable and resiliently held member in balanced relation to transmit relative movements of said supporting means and said frame to equalizing mechanism on the opposite side of said frame.

18. Equalizing mechanism comprising, in combination, a frame, relatively movable supporting means therefor, a freely movable resiliently held member responsive to relative movements of said supporting means and said frame, and draft devices connected to said movable and resiliently held member in balanced relation to transmit relative movements of said supporting means and said frame to equalizing mechanism on the opposite side of said frame.

19. Equalizing mechanism comprising, in combination, a frame, relatively movable supporting means therefor, a freely movable resiliently held member responsive to relative movements of said supporting means and said frame, and flexible draft devices connected to said movable and resiliently held member in balanced relation to transmit relative movements of said supporting means and said frame to equalizing mechanism on the opposite side of said frame.

20. Equalizing mechanism comprising, in combination, a frame, supporting means movable relative thereto, a resiliently held cross bar responsive to relative movements of said supporting means and said frame, flexible draft devices connected to each end of said bar on each side of said supporting means, and means for directing each of said flexible draft devices transversely of the machine and transmit relative movements of said supporting means and said frame to equalizing mechanism on the opposite side of said frame.

21. Equalizing mechanism comprising, in combination, a frame, supporting means movable relative thereto, a resiliently held cross bar responsive to relative movements of said supporting means and said frame, flexible draft devices connected to each end of said bar on each side of said supporting means, and a sheave for directing each of said flexible draft devices transversely of the machine and transmit relative movements of said supporting means and said frame to equalizing mechanism on the opposite side of said frame.

22. Equalizing mechanism comprising, in combination, a frame having guideways, relatively movable supporting means for said frame including a journal box movable in said guideways and provided with spring receiving sockets, springs mounted in said sockets, a cross bar supported on said springs and movable in the guideways of said frame with its ends projecting on either side of said journal box, flexible draft members to transmit relative movements of said supporting means and said frame to equalizing mechanism on the opposite side of said frame, and directing sheaves on said frame at substantially right angles to each other to direct said flexible draft members across said frame.

23. In mechanism of the class described, a journal box having its ends formed to engage and slide in guideways, resilient supports on said box, a cross bar supported in substantially balanced position on said resilient supports, said bar being provided with guideway engaging means carried by said supports and having its ends extended beyond said box, and means on the extended ends of said bar to engage equalizing transfer mechanism.

24. In mechanism of the class described, a journal box having its ends formed to engage and slide in guideways and provided with spring holding seats, springs supported by said seats, a cross bar supported in substantially balanced position on said springs, said bar being provided with guideway engaging means carried by said springs and having its ends extended beyond said box, and means on the extended ends of said bar to engage equalizing transfer mechanism.

25. In mechanism of the class described, a journal box having its ends formed to engage and slide in guideways and provided with spring receiving sockets, springs mounted in said sockets, a cross bar supported in substantially balanced position on said springs, said bar being provided with guideway engaging means carried by said springs and having its ends extended beyond said box, and means on the extended ends of said bar to engage equalizing transfer mechanism.

26. In mechanism of the class described, a journal box having its ends formed to engage and slide in guideways and provided with spring sockets on each side of the journal bearing, springs mounted in said sockets, a cross bar supported in substantially balanced position on said springs, said bar being provided with guideway engaging means carried by said springs and having its ends extended beyond said box, and means on the extended ends of said bar to engage equalizing transfer mechanism.

In testimony whereof I have hereunto set my hand.

NILS D. LEVIN.